United States Patent [19]

Carlson

[11] Patent Number: 4,909,095

[45] Date of Patent: Mar. 20, 1990

[54] TELESCOPIC HELM

[75] Inventor: John A. Carlson, Wayne, Pa.

[73] Assignee: Teleflex Incorporated, Limerick, Pa.

[21] Appl. No.: 300,495

[22] Filed: Jan. 23, 1989

[51] Int. Cl.$^4$ .............................................. B62D 1/18
[52] U.S. Cl. ........................................ 74/493; 74/531
[58] Field of Search .................. 74/493, 531; 403/290, 403/374, 383; 280/775, 278, 279; 279/41 R, 46 R, 42, 53, 52

[56] References Cited

U.S. PATENT DOCUMENTS

| | | | |
|---|---|---|---|
| 614,944 | 11/1898 | Gaylor. | |
| 973,806 | 10/1910 | Noble. | |
| 2,676,811 | 4/1954 | Kindley | 279/53 |
| 3,369,925 | 2/1968 | Runkle et al. | 74/493 |
| 3,444,753 | 5/1969 | Runkle | 74/493 |
| 3,962,931 | 6/1976 | Moneta | 74/493 |
| 4,263,903 | 4/1981 | Griggs | 279/53 |
| 4,347,757 | 9/1982 | Martin. | |
| 4,418,582 | 12/1983 | Martin. | |
| 4,572,023 | 2/1986 | Euler. | |
| 4,813,910 | 3/1989 | Stone | 74/493 X |

Primary Examiner—James R. Brittain
Attorney, Agent, or Firm—Reising, Ethington, Barnard, Perry & Milton

[57] ABSTRACT

A telescopic helm (10) having a steering drive shaft (12) and a steering wheel shaft (14) separated by a collet (32) to axially adjust the position of a steering wheel hub (18) of a vehicle. The steering wheel shaft (14) has an inner wedged surface (20) and the collet (32) has an outer wedged surface (22) which, when in contact with each other, produce a radially, inwardly directed force that grips the steering drive shaft (12) preventing axial movement of the steering wheel shaft (14). When the wedged surfaces (20,22) are moved out of contact with each other, the radially inwardly directed force is relieved allowing the steering wheel shaft (14) to move axially relative to the support structure (24). The assembly is characterized by the collet (32) having fingers defining the wedged surfaces (22) for clamping engagement inwardly about the steering wheel shaft (14).

8 Claims, 3 Drawing Sheets

TELESCOPIC HELM

TECHNICAL FIELD

This invention relates to steering helms for vehicles. More particularly, the invention relates to a vehicular steering helm having a teescopically adjustable steering shaft.

BACKGROUND ART

It is often desirable to axially adjust the position of the steering wheel of a vehicle. The first advantage in having the ability to axially adjust the steering wheel is the comfort gained by having the steering wheel at an optional position as a function of the operator's arm length. The operator may sit comfortably close to or far from the steering wheel. The second advantage in having axial adjustment is the increased ease in entering and exiting the driver's seat. Large operators need more room with which to enter and exit the driver's seat, but do not necessarily need the space between themselves and the steering wheel once they are in the driver's seat.

Several patents disclose telescopic helms. These include: the U.S. Pat. No. 614,944 to Gaylor, issued Nov. 29, 1898; U.S. Pat. No. 973,806 to Noble, issued Oct. 25, 1910; U.S. Pat. No. 4,347,757 to Martin, issued Sept. 7, 1982; U.S. Pat. No. 4,418,582 to Martin, issued Dec. 6 1983; and U.S. Pat. No. 4,572,023 to Euler, issued Feb. 25, 1986. These patents disclose various designs embodying cam surfaces producing an outwardly directed force that locks the steering wheel shaft axially in place. These designs are all deficient in two aspects. First, these designs necessitate a sheath extending the length of the adjustable portion of the helm. This adds material costs by adding a sheath, and support and alignment structure to the design. Second, since the sheath is an outer structure, it is prone to crimps and dents which will lessen the range of the axial movement and/or the effectiveness of the outward force being placed on the sheath.

SUMMARY OF THE INVENTION AND ADVANTAGES

According to the present invention, there is provided a telescoping steering wheel assembly. The assembly is comprised of a steering wheel drive shaft for connection to a vehicle steering mechanism, a steering wheel shaft axially movable relative to the steering drive shaft and support means for attachment to a vehicle body for rotatably supporting at least one of the shafts. The steering wheel shaft is rotatably and axially movable relative to the support means. A clamping means interconnects the shafts for positioning the steering wheel shaft in any one of various positions axially along the steering drive shaft. The assembly is characterized by the clamping means being movable radially to apply a radially inwardly directed clamping force to grip about the steering drive shaft.

This design incorporating the inward clamping force overcomes the disadvantages inherent in the prior art by extending the shaft up to the axially adjustment means. This negates the necessities of the sheath which, in turn, negates the necessity of the support and alignment structures of the sheath. The steering drive shaft is a solid, internal part sheltered from of the environment conducive to denting or crimping. This allows the telescoping means to perform in a more efficient manner with a lessened amount of repair.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 2:
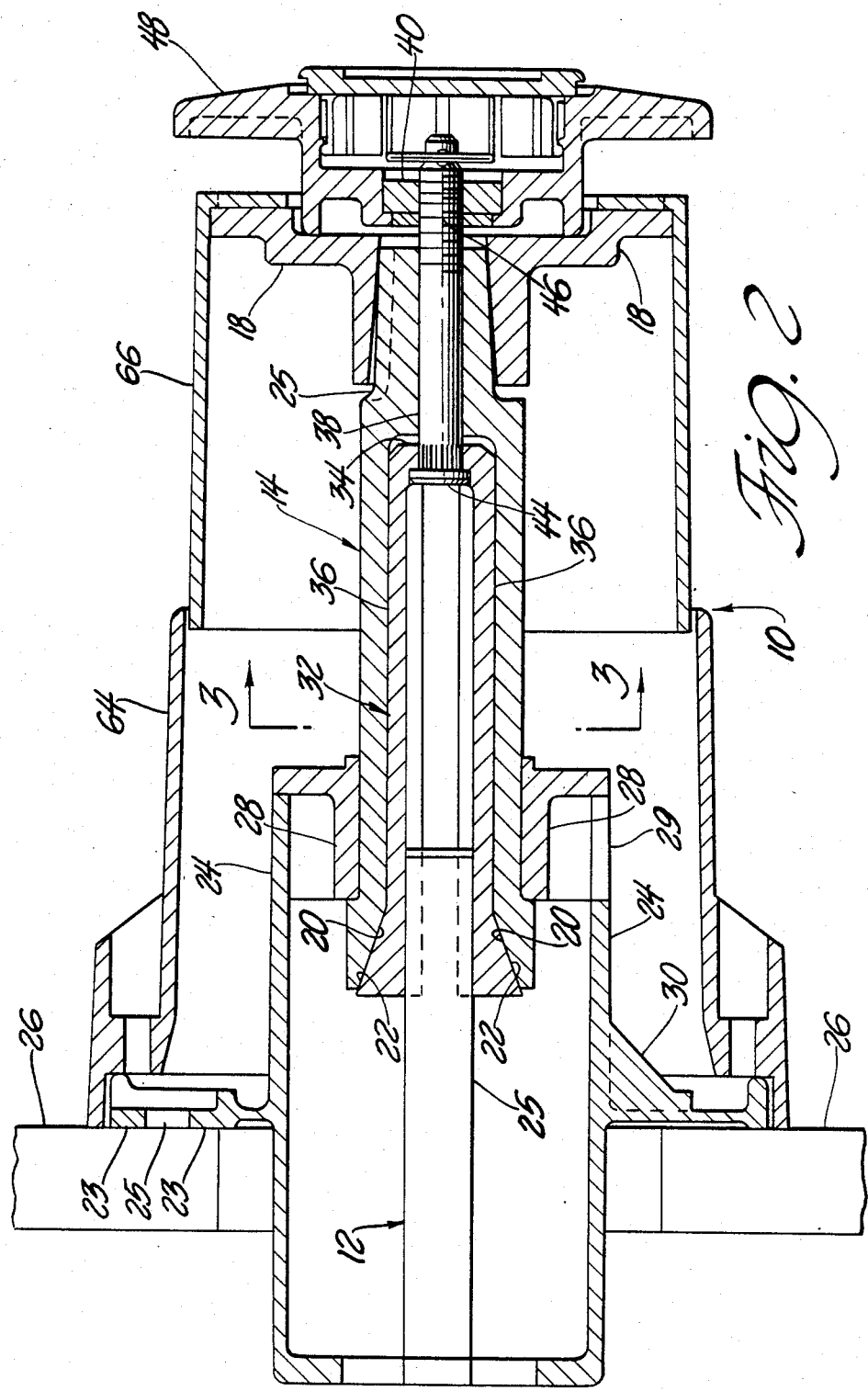
FIG. 2 is a cross section of the preferred embodiment of the subject invention.

Referring to FIG. 2, a telescopic steering assembly for a vehicle is generally shown at 10. The assembly comprises a steering drive shaft, generally indicated at 12. The first end (not shown) of the steering drive shaft 12 is connected to the vehicle steering mechanism; this mechanism is of any type well known in the art. The second end 27 of the steering drive shaft 12 is connected to a steering wheel shaft, generally indicated at 14. The steering wheel shaft 14 is axially movable relative to the steering drive shaft 12. A support means defined by the structure 24 is used to attach at least one of the above mentioned shafts 12,14 to the vehicle body 26. The support structure 24 includes a flange 23 with a securing means 25 to fixedly secure the support structure 24 to the vehicle body 26. The securing means 25 is a hole for a bolt, rivet or any other suitable fastener. A bushing 28 is used to interconnect the support structure 24 with at least one of the shafts 12,4, the steering wheel shaft 14 in the preferred embodiment. A key 29 is used to properly align the bushing 28 with the support structure 24. The steering drive shaft 12 is axially immoveable with respect to the support structure 24. The support structure 24 also includes supports 30 needed to hold the weight of the steering wheel hub 18 and subsequent steering wheel (not shown).

The steering wheel shaft 14 is rotatably and axially moveable relative to the support structure 24. The bushing 28 allows the steering wheel shaft 14 to rotate relative to the support structure 24. A key 25 prevents the steering wheel shaft 14 from rotating relative to the steering wheel hub 18.

A clamping means interconnects the steering wheel shaft 14 and the steering drive shaft 12 for positioning the steering wheel shaft 14 in any one of a number of positions axially along the steering drive shaft 12. This clamping means is moveable radially to apply a radially inwardly directed clamping force to grip about the steering drive shaft 12. The clamping means is characterized by a structure including a collet, generally indicated at 32 with a base 34 and axially extending fingers 36 disposed about the steering drive shaft 12. The preferred embodiment utilizes two opposing fingers 36 with flat sides 60. These fingers 36 are mirror images of each other.

The clamping means also includes tightening means forcing the fingers 36 into inwardly clamping engagement with the steering drive shaft 12. The tightening means includes two sets of coacting wedge means 20,22 axially moveable for wedging engagement with the steering wheel shaft 14. The first set of wedges 22 is a part of the outwardly facing surfaces of the two fingers 36 of the collet 32. The second set 20 of coacting wedges is a part of the inwardly facing surfaces of the steering wheel shaft 14.

The clamping means further includes adjustment means 38,40 for the axial movement of the steering wheel shaft 14 for moving the first set of wedges 20,22 radially into and out of the wedging engagement with the second set of wedges 20 of the steering wheel shaft 14, thus applying and releasing the radially inwardly directed force, respectively. The adjustment means is preferably manually actuable. The adjustment means includes a bolt 38 having a tool engagement end 44 and a threaded end 46. The tool engagement end 44 is secured to the base 34 of the collect 32. FIG. 2 shows the tool engagement end 44 secured to the base 3 of the collet 32 between the two fingers 36.

The adjustment means further includes a nut 40 treadably connected to the threaded end of the bolt 38. The nut 40 is axialy held in place relative to the base 48 of the steering wheel hub 18 by the steering wheel hub 18 and may rotate with respect to the steering wheel hub 18. When the nut 40 is rotated to loosen the bolt 38, the bolt 38 slides the collet 32 relative to the steering wheel shaft 14 (to the left as viewed in FIG. 3) which disengages the clamping force by releasing the pressure on the wedges 20,22. In other words, as the bolt 38 is loosened, the bolt 38 moves axially (to the left in FIG. 3). Because the bolt 38 is fixed to the collet 32, the collet 32 also moves axially. This causes the wedge surface 22 to disengage the wedge surface 20 thereby releasing the inwardly directed force. The steering wheel shaft 14 may then be moved axially relative to the steering drive shaft 12. The nut 40 may be retightened which will pull the wedges 20,22 back together by reversing the movement of loosening the bolt 38 as previously described, thus producing a clamping force on the steering drive shaft 12 rendering the steering wheel hub 18 axially immoveable or locked in the position desired.

Figure 3:
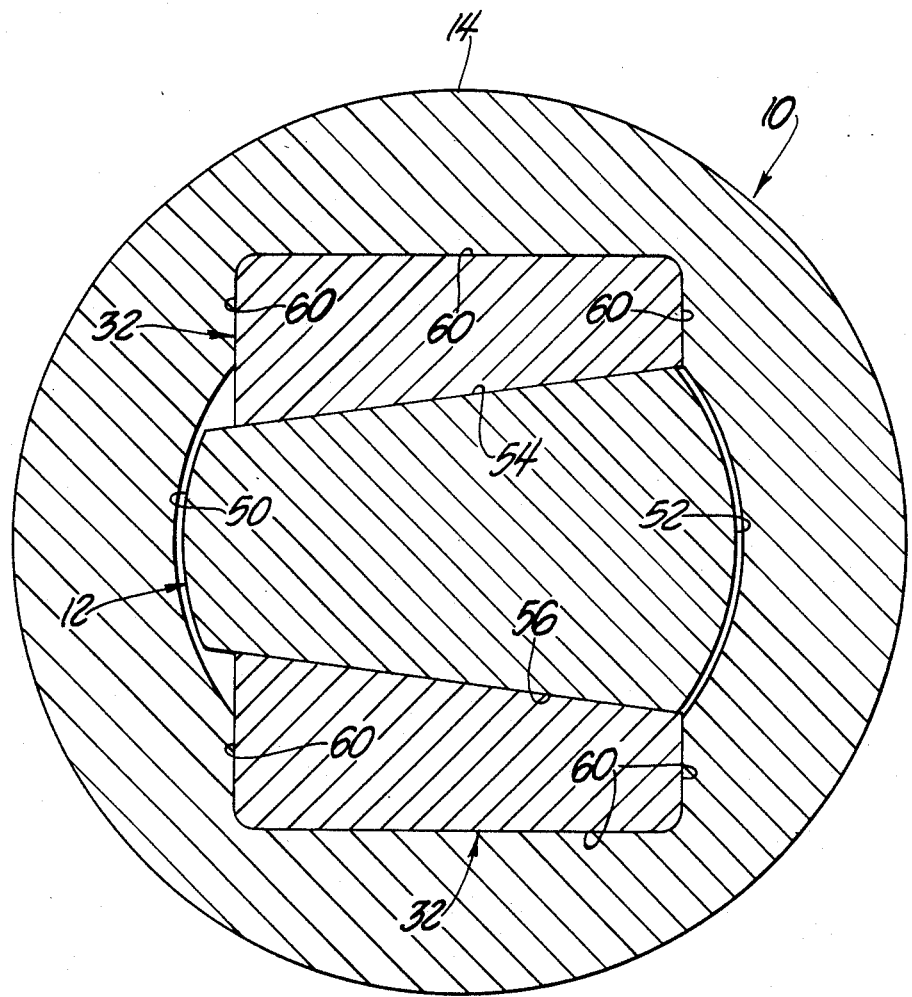
FIG. 3 is a cross section taken substantially along line 3—3 of FIG. 2.

As can be seen in FIG. 3, the first cross section of the steering drive shaft 12 allows neither rotational movement nor side movement relative to the collet 32. The periphery of this first cross section is comprised of two arcuate portions 50,52 separated by two flat portions 54,56 with each of the two arcuate portions 50,52 being of unequal lengths. In other words, the flat portions 54,56 are not parallel to each other, producing a cross section which closely resembles a trapezoid. Thus, when the collet 32 clamps down on the steering drive shaft 12, the steering drive shaft 12 will not slide back and forth within the steering drive shaft 12 because the force applied by the collet 32 upon the steering drive shaft 12 has a nonzero horizontal component which forces the steering drive shaft 12 to one side of the steering wheel shaft 14. This greatly enhances the feel of the telescopic helm 10 for it limits the rotational play between the steering drive shaft 12 and the steering wheel shaft 14.

Figure 1:
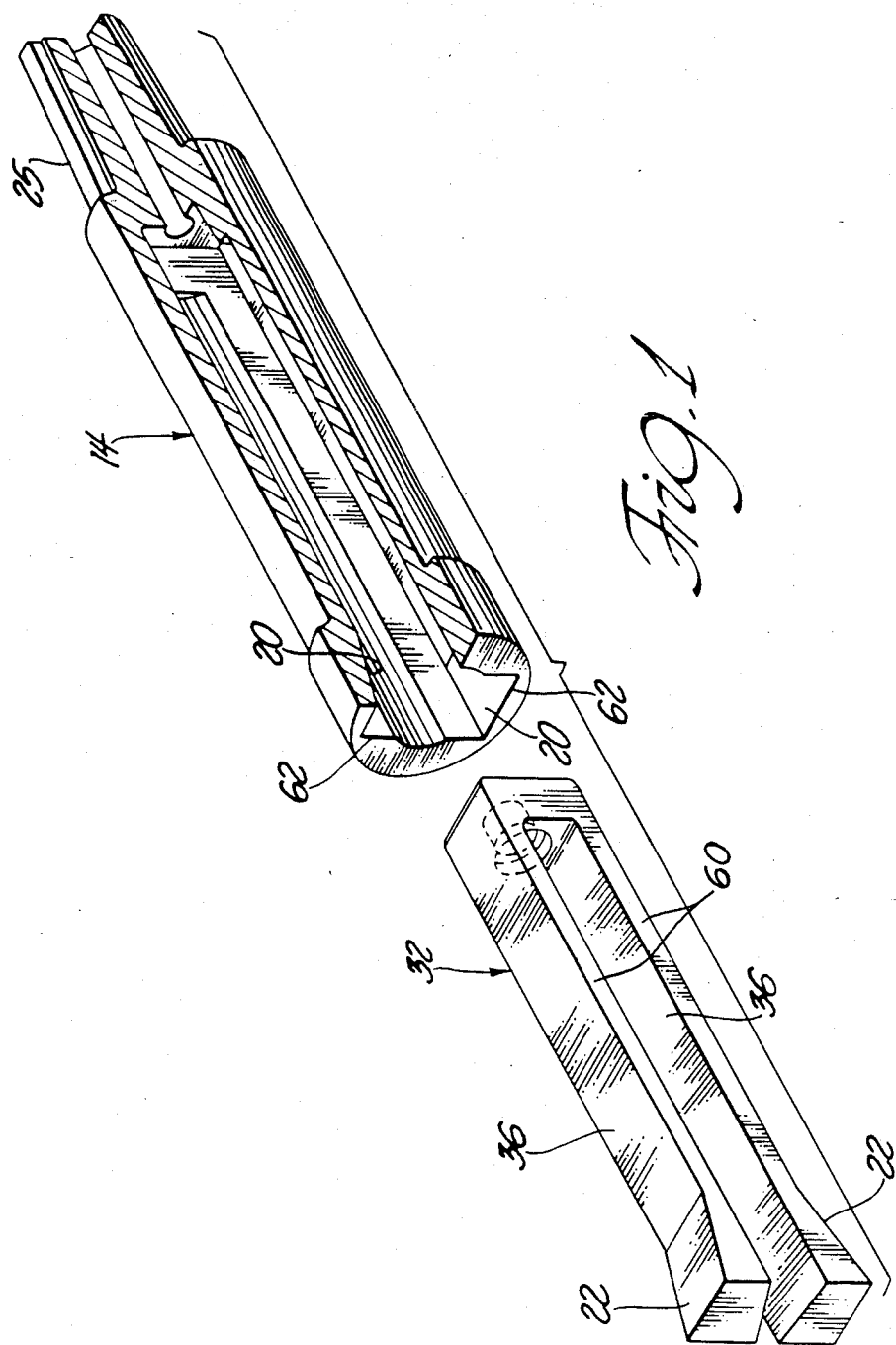
FIG. 1 is a fragmentary perspective view, partially cut away and in cross section, of the preferred embodiment of the collet and the steering wheel shaft.

The second cross section of the collet 32 allows no relative rotational movement between the collet 32 and steering wheel shaft 14. As shown best in FIG. 3, the second cross section of the collet 32 is roughly a rectangular one. The straight edges 60 of the collet 32 fit snugly within the substantially rectangular opening 62 (FIG. 1) at the end of the steering wheel shaft 14. This second cross section also reduces the amount of rotational play between the steering drive shaft 12 and the steering wheel shaft 14.

The telescopic helm assembly 10 also includes a protective covering 64,66 which covers the entire telescopic helm 10. The first half 64 of the covering is connected to the support structure 24. The second half 66 of the covering is connected to the steering wheel hub 18. The second half 66 of the protective covering has a radius less than the radius of the first half of the cover. The covering 64,66 adds to the protection of the steering wheel shaft 14 and enhances the outward appearance of the steering wheel shaft 14.

In operation, the assembly 10 is initially locked. That is, the steering wheel shaft 14 is axially immoveable with respect to the steering drive shaft 12. When the nut 40 is unscrewed, the bolt 38, and subsequently the collet 32, moves axially relative to the steering wheel shaft 14. This separates the set of wedges 20,22 of the collet 32 from the wedge of the steering wheel shaft 14 which releases the radially inwardly directed force that grips the steering drive shaft 12. The steering wheel hub 18 is then moved axially to the desired position. Once the steering wheel hub 18 is moved to the desired position, the nut 40 is retightened. The wedges 22 of the collet 32 are forced back into contact with the wedges 20 of the steering wheel shaft 14 which reproduces the radially inwardly directed force on the steering drive shaft 12. The steering wheel hub 18 is then locked into the desired position.

The invention has been described in an illustrative manner, and it is to be understood that the terminology which has been used is intended to be in the nature of words of description rather than of limitation.

Obviously, many modifications and variations of he present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A telescopic steering wheel assembly (10) for a vehicle comprising; a steering drive shaft (12) for connection to a vehicle steering mechanism, a steering wheel shaft (14) axially moveable relative to said steering drive shaft (112), support means (24) for attachment to a vehicle body (26) for rotatably supporting at least one of said shafts (12,14), said steering wheel shaft (14) rotatably and axially moveable relative to said support means (24), clamping means interconnecting said shafts (12,14) for positioning said steering wheel shaft (14) in any one of various positions axially along said steering drive shaft (12), said assembly characterized by said clamping means being moveable radially to apply a radially inwardly directed clamping force to grip about said steering drive shaft (12), and said steering drive shaft (12) including a first cross section contacted by said clamping means having a periphery comprising arcuate portions (50,52) separated by flat portions (54,56) with said arcuate portions (50,52) beng of unequal length.

2. An assembly as set forth in claim 1 further characterized by said clamping means including a collet (32) with axially extending fingers (36) disposed about said steering drive shaft (12) and tightening means (14,32) for forcing said fingers (36) into clamping engagement with said steering drive shaft (12).

3. An assembly as set forth in claim 2 further characterized by said tightening means including wedge means (20,22) axially moveable for wedging engagement with said steering wheel shaft (14) and adjustment means (38,40) manually actuatable for axial movement relative to said shafts for moving said wedge means (20,22) radially into and out of wedging engagement with said steering wheel shaft (14).

4. An assembly as set forth in claim 3 further characterized by said adjustment means including a bolt means (38) having a tool engagement end (44) and a threaded end (46) and said tool engagement end (44) of said bolt means (38) secured relative to said collet (32).

5. An assembly as set forth in claim 4 further characterized by said bolt means (38) including a nut (40) adjacent said steering wheel shaft (14) threadably connected to said threaded end (46) of said bolt (38).

6. An assembly as set forth in claim 5 further characterized by said first cross section having a periphery comprising two arcuate portions (50,52) separated by two flat portions (54,56) with said arcuate portions (50,52) being of unequal length.

7. An assembly as set forth in claim 2 further characterized by said collet (32) including a second cross section which allows no relative rotational movement between said collet (32) and said steering wheel shaft (14).

8. An assembly as set forth in claim 7 further characterized by said second cross section including flat sides (60) for eliminating any rotational displacement between said collet (32) and said steering wheel shaft (14).

* * * * *